No. 821,192. PATENTED MAY 22, 1906.
C. RAUHE.
SET OF ARTIFICIAL TEETH.
APPLICATION FILED JAN. 6, 1906.
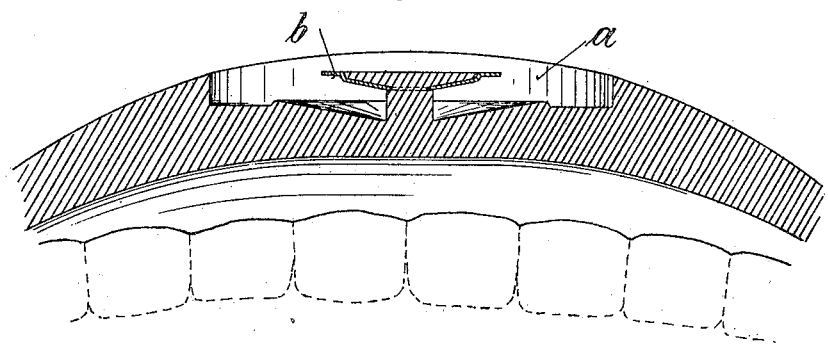
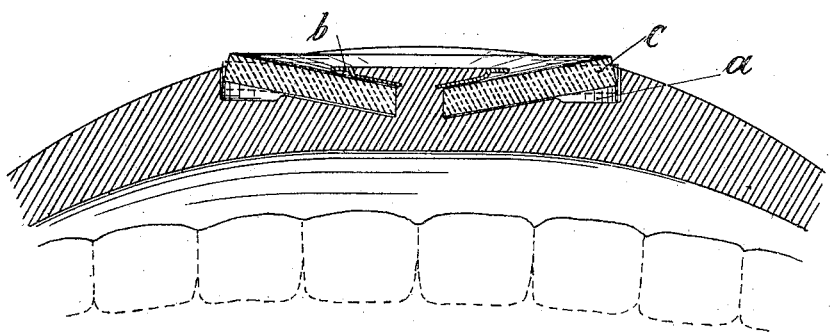

UNITED STATES PATENT OFFICE.

CARL RAUHE, OF DÜSSELDORF, GERMANY.

SET OF ARTIFICIAL TEETH.

No. 821,192.　　　Specification of Letters Patent.　　　Patented May 22, 1906.

Application filed January 6, 1906. Serial No. 294,852.

*To all whom it may concern:*

Be it known that I, CARL RAUHE, dentist, a citizen of the German Empire, residing at Düsseldorf, Germany, have invented certain new and useful Improvements in Sets of Artificial Teeth, of which the following is a specification.

My invention relates to a contrivance for retaining a set of artificial teeth in position by atmospheric pressure. Said contrivance gives the rubber disk fixed to the denture the form of a cup, which shape is necessary to obtain the suction. At present the rubber disk is brought into this form by means of central pressure by the fastening screw or rivet or such against the plate, or else by a stud fixed to the denture. The shank of the stud being shorter than the thickness of the rubber collar gives the latter, by means of compression, the necessary cup shape. In both these cases the rubber is dished or turned up at the edges by means of central pressure. In consequence of the squeezing against the denture the india-rubber disk gets brittle and crumbly and loses its power of adhesion and suction in a very short time.

The object of my invention is to remove the disadvantage set forth. This is done by means of a new contrivance of the suction-cavity containing the suction rubber disk, illustrated by the accompanying enlarged drawings, in—

Figure 1, in cross-section without the rubber disk, and in Fig. 2 in cross-section with the rubber disk embedded in.

In order to give the rubber disk the cup form, the bottom of the suction-cavity *a* is formed at an ascending angle from the middle, and the central retaining-plate *b* or the under edge of the head of stud or screw for the rubber disk *c* has a corresponding angle of ascent, as shown in the drawings, thus being parallel to the bottom of the cavity.

In consequence of the new form of the suction-cavity the rubber disk receives the cup-like form without any pressure and being free from the resulting expansion will last much longer than by the old method of fastening. To allow the outside rim of the rubber disk to recede when placing the denture in the mouth, the outside edge or circumference of the cavity *a* is deepened, as shown in the drawings.

I claim—

1. Suction-cavity for artificial teeth with a bottom ascending angle from the center to give the suction-rubber the necessary cup-like form for suction, substantially as described and for the purpose set forth.

2. Suction-cavity for artificial teeth with a bottom ascending angle from the center and a stud for retaining the rubber disk with ascending line parallel to the bottom of the cavity, substantially as described and for the purpose set forth.

3. Suction-cavity for artificial teeth with a bottom ascending angle from the center and the outside edge or circumference of the bottom deepened, substantially as described and for the purpose set forth.

In testimony whereof I have hereunto subscribed my name in the presence of two witnesses.

CARL RAUHE.

Witnesses:
　WILLIAM ESSENWEIN,
　PETER LIEBER.